G. WARNER.
SULKY PLOW.
APPLICATION FILED SEPT. 5, 1908.

910,752.

Patented Jan. 26, 1909.
2 SHEETS—SHEET 1.

Witnesses

Inventor
George Warner,
By
Attorneys

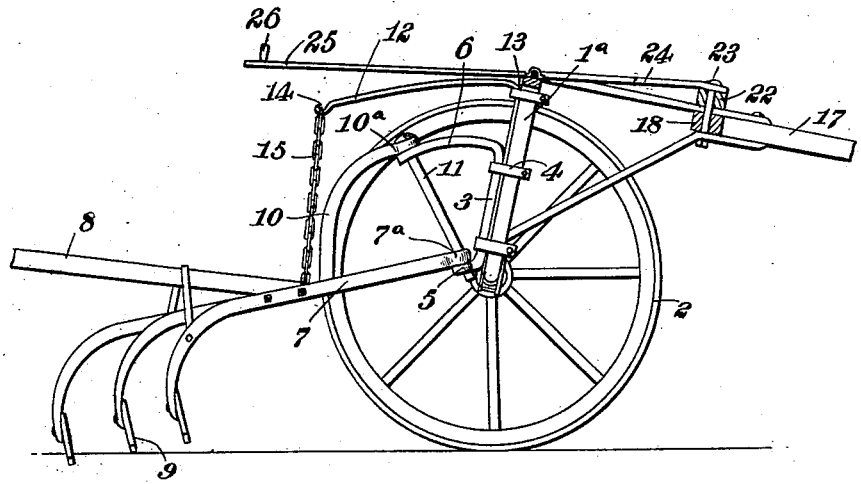
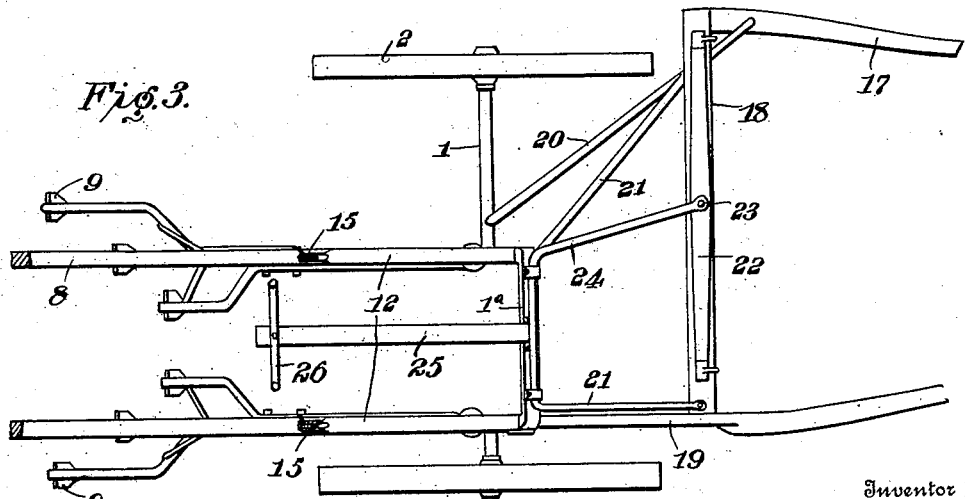

UNITED STATES PATENT OFFICE.

GEORGE WARNER, OF HUNTERTOWN, INDIANA.

SULKY-PLOW.

No. 910,752.  Specification of Letters Patent.  Patented Jan. 26, 1909.

Application filed September 5, 1908. Serial No. 451,807.

*To all whom it may concern:*

Be it known that I, GEORGE WARNER, citizen of the United States, residing at Huntertown, in the county of Allen and State of Indiana, have invented certain new and useful Improvements in Sulky-Plows, of which the following is a specification.

The present invention relates to improvements in agricultural implements and more particularly to a sulky corn plow which is designed to be employed in connection with a single draft animal and embodies a novel construction, whereby the cultivator shovels can be moved both vertically and laterally as desired.

The object of the invention is the provision of an implement of this character which can be readily manipulated by a single person and will operate in an effective manner to accomplish the desired result.

Figure 1:
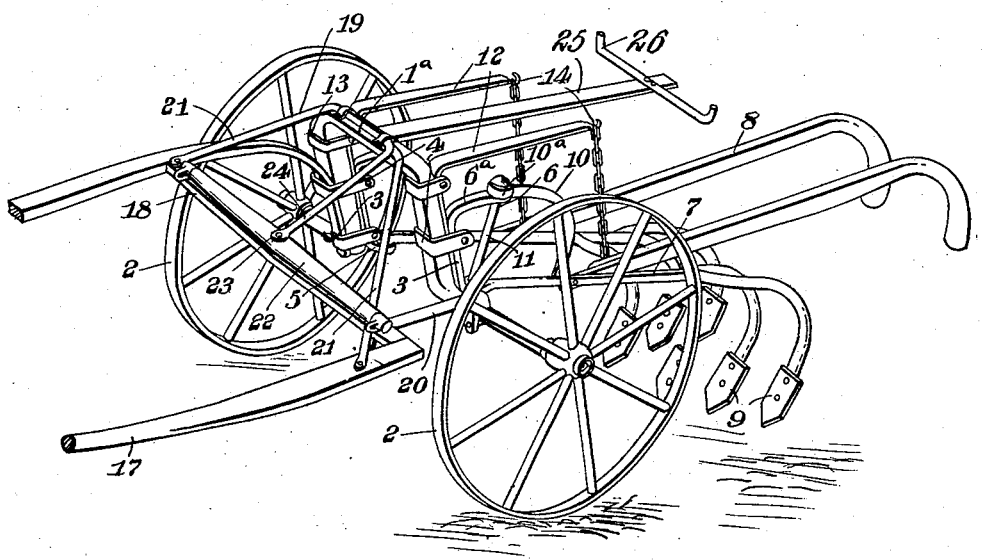
Figure 4:
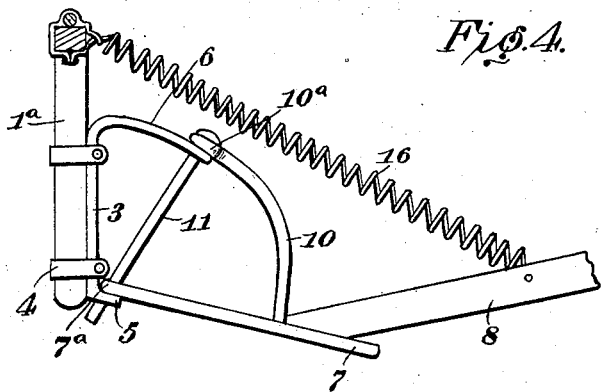

For a full understanding of the invention and the merits thereof and also to acquire a knowledge of the details of construction and the means for effecting the result, reference is to be had to the following description and accompanying drawings, in which:

Figure 1 is a perspective view of a sulky plow constructed in accordance with the invention; Fig. 2 is a longitudinal sectional view through the same; Fig. 3 is a top plan view, and Fig. 4 is a detail view showing a slight modification.

Corresponding and like parts are referred to in the following description and indicated in all the views of the drawings by the same reference characters.

Specifically describing the present embodiment of the invention, the numeral 1 designates the axle, the central portion of the axle being arched, as indicated at $1^a$, while the usual supporting wheels 2 are journaled upon the ends of the axle. An upright bar 3 is rigidly secured by any suitable means, such as the clips 4, to the lower portion of each side of the arch $1^a$, the lower end of the bar being formed with a rearwardly extending eye 5, while the upper end is formed with a rearwardly extending and downwardly curved arm 6, the said arm being provided with a longitudinal slot $6^a$. Trailing behind each side of the arch $1^a$ of the axle is a cultivator beam 7, each of the beams being provided with the usual handle 8 and cultivator shovels 9.

The forward end of each of the beams 7 terminates in an eye $7^a$ and is provided with an upwardly extending and forwardly curved arm 10 which also terminates in an eye $10^a$. The eye $7^a$ is designed to fit over the eye 5 at the lower end of the corresponding upright bar 3, while the eye $10^a$ fits over the slot $6^a$ of the arm 6 at the upper end of the said upright bar. Passing through the two eyes of the cultivator beam, the slot $6^a$, and the eye 5, is a pin 11. It will be obvious that with this construction, the cultivator beam can swing laterally about the pin 11 as a center and that the upper end of the pin will swing within the slot $6^a$ to admit of the cultivator shovels being raised and lowered as desired.

A spring strip 12 is secured in any suitable manner, as by means of the clips 13, to the upper portion of each side of the arched portion $1^a$ of the axle, and the upper end of each of the said spring strips is extended rearwardly and terminates over the corresponding cultivator beam in a hook 14. A chain 15 or like member connects the hooked end of the spring strip to the cultivator beam and causes the spring to exert an upward pull upon the beam, thereby counterbalancing the same and enabling the beam to be raised and lowered as desired, with a very small amount of exertion.

A slight modification is shown in Fig. 4, in which the spring strips 12 are omitted and coil springs 16 are substituted, one end of each of the coil springs being connected to the top of the arch $1^a$, while the opposite end is connected to the cultivator beam.

The horse or other draft animal is designed to be hitched between the shafts 17 which are offset upon one side of the implement so that the line of draft does not correspond with the longitudinal axis thereof. The rear ends of the shaft 17 are joined by the cross bar 18 and one end of the cross bar is connected by means of a brace 19 to one side of the arch $1^a$ of the axle, while the opposite end is connected by a diagonal brace 20 to the opposite end of the axle. It will also be observed that the two ends of the cross bar 18 are joined to the top of the arch $1^a$ by the rods or braces 21. The usual swingle-tree is mounted upon the cross bar 18 and pivoted upon the pin 23, the upper end of the pin being connected to the top of the arch $1^a$ by a tie member 24. It will thus be apparent that the draft animal travels upon one side of the longitudinal axis of the implement and that the cultivator beams can be swung upwardly and from side to side to move the cultivator shovels both vertically and laterally, the said beams being pivotally mounted upon the pins 11 to turn about a vertical axis, while the pins are mounted to swing about a horizontal axis.

Projecting rearwardly from the arched portion 1ª of the axle is a bar 25, the rear end of which is provided with the laterally projecting hooked arms 26. When it is desired to turn a corner or for any other reason to hold the cultivator shovels in an inoperative position, the beams 7 are lifted and swung over upon the arms 27 so as to be held in an elevated position thereby.

Having thus described the invention, what is claimed as new is:

1. In a sulky plow, the combination of an axle, wheels mounted upon the axle, an upright pivot pin carried by the axle and mounted to swing about a horizontal axis, a beam pivoted upon the pin to turn about a vertical axis, and a cultivator member carried by the beam.

2. In a sulky plow, the combination of an axle, wheels mounted upon the axle, an eye projecting from the axle, a slotted arm projecting from the axle over the eye, a beam terminating in an eye fitting against the eye of the axle, and provided with an arm terminating in an eye fitting against the slotted arm of the axle, a pivot pin passing through the eyes of the beam, the slotted bracket and the eye of the axle, whereby the beam can be swung both vertically and laterally, and a cultivator member upon the beam.

3. In a sulky plow, the combination of an axle, wheels mounted upon the axle, an upright pivot pin carried by the axle and mounted to swing about a horizontal axis, a beam pivoted upon the pin to swing about a vertical axis, a cultivator member carried by the beam, and means for applying draft upon one side of the axis of the implement.

4. In a sulky plow, the combination of an axle, wheels mounted upon the axle, a pivot pin carried by the axle and mounted to swing about a horizontal axis, a beam pivoted upon the pivot pin to swing about a vertical axis, a cultivator member carried by the beam, and a spring for counteracting the weight of the beam.

5. In a sulky plow, the combination of an axle, wheels mounted upon the axle, a pivot pin carried by the axle and mounted to swing about a horizontal axis, a beam pivoted upon the pivot pin to swing about a vertical axis, a cultivator member carried by the beam, and a spring strip projecting rearwardly over the beam and connected thereto for counterbalancing its weight.

6. In a sulky plow, the combination of an arched axle, wheels mounted upon the ends of the axle, an upright pivot pin mounted upon each side of the arch of the axle to swing about a horizontal axis, a beam pivoted upon each of the pins to swing about a vertical axis, a cultivator member carried by each of the beams, a pair of shafts off-set upon one side of the longitudinal axis of the device, a bar connecting the shafts, braces between the bar and the lower portion of the axle, and braces between the bar and the top of the arched portion of the axle.

In testimony whereof I affix my signature in presence of two witnesses.

GEORGE WARNER. [L. S.]

Witnesses:
 CHARLES MYERS,
 ARTHUR BLEEKMAN.